United States Patent
Shah et al.

(10) Patent No.: US 10,625,320 B2
(45) Date of Patent: Apr. 21, 2020

(54) APPARATUS AND METHOD FOR BENDING A PIPE AND TESTING ACCURACY OF A BENT SHAPE OF THE PIPE

(71) Applicants: USUI CO., LTD., Shimizu-cho, Sunto-gun, Shizuoka (JP); USUI INTERNATIONAL CORPORATION, Chesapeake, VA (US)

(72) Inventors: Vishal Shah, Chesapeake, VA (US); Masakazu Koike, Shimizu-cho (JP)

(73) Assignee: Usui Co., Ltd. (JP)

( * ) Notice: Subject to any disclaimer, the term of this patent is extended or adjusted under 35 U.S.C. 154(b) by 167 days.

(21) Appl. No.: 15/848,619

(22) Filed: Dec. 20, 2017

(65) Prior Publication Data
US 2019/0184440 A1    Jun. 20, 2019

(51) Int. Cl.
| | |
|---|---|
| *B21D 7/024* | (2006.01) |
| *B21D 7/14* | (2006.01) |
| *B21D 7/08* | (2006.01) |
| *B21D 7/12* | (2006.01) |
| *G01B 11/27* | (2006.01) |
| *G01B 5/00* | (2006.01) |
| *G01B 3/00* | (2006.01) |
| *G01B 11/14* | (2006.01) |
| *G01B 11/02* | (2006.01) |
| *G01B 11/28* | (2006.01) |
| *G01B 5/14* | (2006.01) |
| *G01B 5/20* | (2006.01) |
| *G01B 11/00* | (2006.01) |

(52) U.S. Cl.
CPC ............... *B21D 7/14* (2013.01); *B21D 7/08* (2013.01); *B21D 7/12* (2013.01); *G01B 3/00* (2013.01); *G01B 5/00* (2013.01); *G01B 5/14* (2013.01); *G01B 5/20* (2013.01); *G01B 11/00* (2013.01); *G01B 11/02* (2013.01); *G01B 11/14* (2013.01); *G01B 11/27* (2013.01); *G01B 11/28* (2013.01)

(58) Field of Classification Search
CPC ... B21D 7/08; B21D 7/12; B21D 7/14; G01B 11/27; G01B 5/00; G01B 5/14; G01B 5/20; G01B 3/00; G01B 11/00; G01B 11/14; G01B 11/02; G01B 11/28
USPC ........................................... 72/31.05
See application file for complete search history.

(56) References Cited

U.S. PATENT DOCUMENTS

| | | | |
|---|---|---|---|
| 3,653,251 A * | 4/1972 | Coonan ........... | B21D 7/12 72/369 |
| 4,122,607 A * | 10/1978 | Hopf ............. | G01B 7/28 33/555 |
| 4,563,802 A * | 1/1986 | Benteler ........ | B21D 53/88 228/147 |
| 4,689,891 A * | 9/1987 | Clark ............ | G01B 3/14 33/529 |
| 4,732,025 A | 3/1988 | Marlinga et al. | |
| 4,744,233 A | 5/1988 | Trudell | |
| 4,938,050 A | 7/1990 | Kimura | |

(Continued)

*Primary Examiner* — David B Jones
(74) *Attorney, Agent, or Firm* — Gerald E. Hespos; Michael J. Porco; Matthew T. Hespos (57) ABSTRACT

An apparatus is provided for bending a pipe and checking a bent shape of the pipe. The apparatus includes a bender for forming a bend in the pipe and at least two cameras for determining an alignment of the pipe in proximity to the free end of the pipe.

5 Claims, 7 Drawing Sheets

(56) References Cited

U.S. PATENT DOCUMENTS

| | | | |
|---|---|---|---|
| 4,947,666 A * | 8/1990 | Hametner | B21D 5/004 |
| | | | 29/407.04 |
| 4,959,984 A | 10/1990 | Trudell et al. | |
| 4,964,290 A | 10/1990 | Kimura | |
| 5,208,995 A * | 5/1993 | McKendrick | G01B 3/14 |
| | | | 33/567 |
| 5,305,223 A | 4/1994 | Saegusa | |
| 5,400,517 A * | 3/1995 | McKendrick | B23Q 1/626 |
| | | | 33/529 |
| 5,566,565 A | 10/1996 | Saegusa | |
| 5,765,426 A | 6/1998 | Saegusa | |
| 5,768,792 A * | 6/1998 | Raab | G05B 19/4207 |
| | | | 33/503 |
| 5,797,289 A | 8/1998 | Hoshino | |
| 6,434,995 B1 | 8/2002 | Kataoka et al. | |
| 6,519,860 B1 * | 2/2003 | Bieg | B23H 7/26 |
| | | | 33/1 PT |
| 7,021,107 B2 | 4/2006 | Saegusa | |
| 7,104,100 B2 | 9/2006 | Saegusa | |
| 7,693,325 B2 * | 4/2010 | Pulla | G01B 21/04 |
| | | | 382/154 |
| 7,908,757 B2 * | 3/2011 | Ferrari | G01B 5/012 |
| | | | 33/503 |
| 2009/0178453 A1 * | 7/2009 | Ghiran | B21D 7/024 |
| | | | 72/31.05 |
| 2013/0319061 A1 * | 12/2013 | Tofini | B21D 7/14 |
| | | | 72/11.1 |
| 2019/0184440 A1 * | 6/2019 | Shah | B21D 7/12 |

\* cited by examiner

APPARATUS AND METHOD FOR BENDING A PIPE AND TESTING ACCURACY OF A BENT SHAPE OF THE PIPE

BACKGROUND

Field of the Invention

The invention relates to an apparatus and a method for bending a pipe into a specified shape and for validating the accuracy of the bent shape.

Description of the Related Art

Most automotive vehicles and many machines require pipes for accommodating flows of liquid or gaseous media. For example, fuel pipes may carry high pressure volatile fuels between a fuel tank, a fuel pump and an engine. Similarly, exhaust pipes must carry high pressure heated exhaust gases from an engine to a location where the exhaust gases can be released safely.

All components of an automotive vehicle, including the pipes, must compete for the limited available space in the vehicle. Additionally, many components of an automotive vehicle generate considerable heat and it often is necessary to separate a bent pipe a specified distance from a heat source. Other components of the vehicle are subject to considerable vibration during use and the bent pipe may have to be spaced a specified distance from a vibrating part. As a result, pipes used in automotive vehicles often require extremely complex bent shapes so that the pipes can reach the specified end positions at the proper alignment and so that the pipes can avoid other components of the vehicle between the end positions.

Automated programmable pipe bending machines are well known for bending fuel pipes, exhaust pipes and such into specified shapes. The typical pipe bending apparatus includes at least one roller about which the pipe is to be bent and at least one clamping jig that is operative to clamp the pipe and to move a specified angular amount about the axis of the roller. Examples of prior art pipe bending devices developed by the assignee of the subject invention include: U.S. Pat. Nos. 5,305,223, 5,566,565, 5,797,289, 6,434,995, 7,021,107, 7,104,100, 4,938,050 and 4,964,290. Examples of prior art pipe bending devices used for bending exhaust pipes are shown, for example, in U.S. Pat. Nos. 4,744,233, 4,732,025 and 4,959,984.

The known pipe bending apparatus theoretically is capable of repeatedly performing very precise bends. However, a pipe is subject to springback after the forces have been released by the clamping jig. The amount of springback is affected by the specific metallurgical characteristics of each pipe, variations in thicknesses of the pipe, the angular amount of each bend, the radius of curvature of each bend, the proximity of one bend to another, the temperature of the pipe at the time of bending and other factors.

The accuracy of a bent pipe can be checked. This typically involves removing the bent pipe from the bending apparatus and placing the bent pipe in a complex arrangement of jigs at specified locations along the length of the bent pipe. A pipe that conforms to the specified bent shape will fit smoothly into the jigs. A pipe that has experienced a spring back different from an anticipated spring back may not fit accurately into the jigs. As a result, such a pipe may be subject to further corrective bending to ensure that the pipe conforms to specifications. Moving a pipe from a bending apparatus to the jigs and possibly then moving the pipe back to a further bending apparatus for corrective reshaping adds considerably to the manufacturing time and cost.

U.S. Pat. No. 4,732,025 discloses a pipe bending apparatus with a mechanical position sensing device that will contact the free end of the pipe during the course of bending to assess the accuracy of the bent condition of the pipe. U.S. Pat. No. 4,732,025 also discloses the use of a photo optical sensor to sense the position of the pipe at one or more locations along the length of the pipe. The photo optical sensor includes a light source and a light detector. An imprecisely bent pipe may prevent light generated by the light source from impinging upon the detector. This apparatus has several drawbacks. For example, a pipe that does not interrupt a light beam directed toward a photodetector is not necessarily bent properly. For example, a surface of the pipe that is too far from the light beam is not detected, and accordingly the photodetector does not provide a true indication of the accuracy of the bend. Additionally, the device shown in U.S. Pat. No. 4,732,025 is intended primarily for exhaust pipes, but can present problems when used with a fuel pipe. In this regard, the mechanical probe that contacts the free end of the pipe is not likely to have any significant adverse effect on the ability of the free end of the exhaust pipe to perform in its intended manner. However, the free end of a fuel pipe typically defines a conical contact surface that must be urged into a concave conical seat of a fitting. Both mating surfaces must be smooth and formed precisely. A mechanical probe can mar the contact surface and can have a very significant adverse effect on the quality of the connection. Furthermore, a mechanical contact with an edge region of a bent pipe or a photo optical sensing of an edge region of a bent pipe does not indicate whether the end of the pipe is aligned properly. An improperly aligned free end of a fuel pipe can result in improper connection to a fitting with serious adverse consequences during use, such as a leakage of fuel.

Accordingly, an object of the subject invention is to provide a bending apparatus that can assure a highly precise bent shape without contacting surfaces that must be smooth and without requiring movement of the bent pipe from the bending apparatus to a remote location where the bent pipe is placed in jigs to assess the bent shape.

SUMMARY

The invention relates to a bending apparatus that incorporates validating devices for validating a shape of a pipe after bending. The bending apparatus may further include a measurement apparatus for measuring dimensions of a pipe prior to bending and for rejecting pipes that do not conform to specified dimensions for the straight pipe prior to bending.

The pipe bender may be of prior art design. For example, the pipe bender may comprise a clamping jig and at least one roller. The clamping jig may be operative to grip the pipe against the roller and to move about the axis of the roller a specified angular amount for forming a bend of a specified radius of curvature and a specified angular extent.

The validating devices of the bending apparatus may include at least one profile validation device that includes at least one pair of profile validation channels. The profile validation channels in each pair can be moved relative to one another between an open position that enables a pipe to be positioned between the profile validation channels of the respective pair and a closed position that enables the profile validation channels to determine the positional accuracy of a specified section of the bent pipe. The bent pipe can be moved by the chuck into a position between the profile validation channels of the respective pair while the profile validation channels are in the open position. The profile validation channels then are moved toward one another and into specified positions that correspond to a range of permissible tolerances for the bent pipe. The profile validation device includes sensors that determine whether the bent pipe contacts either or both of the profile validation channels. A pipe that contacts one or both profile validation channels is not within specified limits and either is designated as a reject or is subject to corrective bending in an effort to bring the bent pipe into a specified tolerance range for acceptable profiles. A bent pipe that does not contact either of the profile validation channels of a respective pair is considered to be acceptable in at least one respect. Two pairs of profile validation channels may be provided and may be disposed to validate the profile of the bent pipe at two sections along the bent pipe, such as at two straight sections of the bent pipe.

The profile validation device may include back-check sensors to check the position of the validation channels after each profile validation or after a specified number of profile validations. The back-check sensors are provided in view of the possibility that contact between a pipe and a profile validation channel can move the profile validation channel from its specified position. Any such movement of a profile validation channel can result in inaccurate profile validation results. The back-check sensors confirm that each profile validation channel is in its specified position and at its specified alignment.

The validating devices of the bending apparatus may further comprise an end check apparatus disposed at a specified position to be near the free end of the pipe after forming all specified bends in the pipe. The end check apparatus may include two cameras that are angularly aligned to one another and preferably that are perpendicular to one another. The cameras may be at specified positions to capture images of areas of the bent pipe near the free end of the pipe. The images may be compared to specified stored images to determine, without contacting the pipe, whether the free end of the pipe is within a specified range of angular alignments and positions for the free end of the pipe. The camera poses no risk to forming scratches or other damage in the seat faces of the pipe ends because there is no contact with the seat face at the free end of the pipe. The end check apparatus may further comprise a criteria pin to define a frame of reference or datum at a specified position and a specified alignment relative to the free end of a pipe that has been bent properly. The criteria pin is at a position to appear in the image created by the cameras. The cameras and/or software associated with the cameras will compare the actual position and alignment of the free end of the bent pipe to the position and alignment of the frame of reference or datum provided by the criteria pin. This comparison will be able to identify pipes that are not within specified ranges of acceptable bent shapes.

The bending apparatus further comprises a controller for determining the amount of bending to be carried out at each bend location. The controller also validates the position and angular alignment of the free end of the pipe and intermediate positions of the pipe, compares the position and alignment information and determines whether the bent pipe meets specifications. The controller will instruct the chuck to transfer an unacceptable pipe to a reject bin. On the other hand, the controller will instruct the chuck to transfer an acceptably bent pipe to a location for shipment to a customer or for incorporation into an apparatus, such as a vehicle.

The invention also relates to a pipe bending method that includes—using at least one profile validation device and at least one camera for determining the position and alignment of the intermediate sections of the pipe and/or the free end of the pipe. Data received from the profile validation device may be used with position and alignment data measured by the camera at the free end of the pipe, and these measured data then may be compared to specified position and alignment data to determine whether the bent pipe conforms to a specified bent shape or is within a specified acceptable range of positions and alignments. Bent pipes that do not conform to specifications may be moved to a reject location or may be marked for subsequent movement to a reject location. Pipes that conform to the specification are moved to a location for shipment to a customer or to a location in the facility for connecting the pipe to an appropriate vehicle or other apparatus.

DETAILED DESCRIPTION

Figure 1:
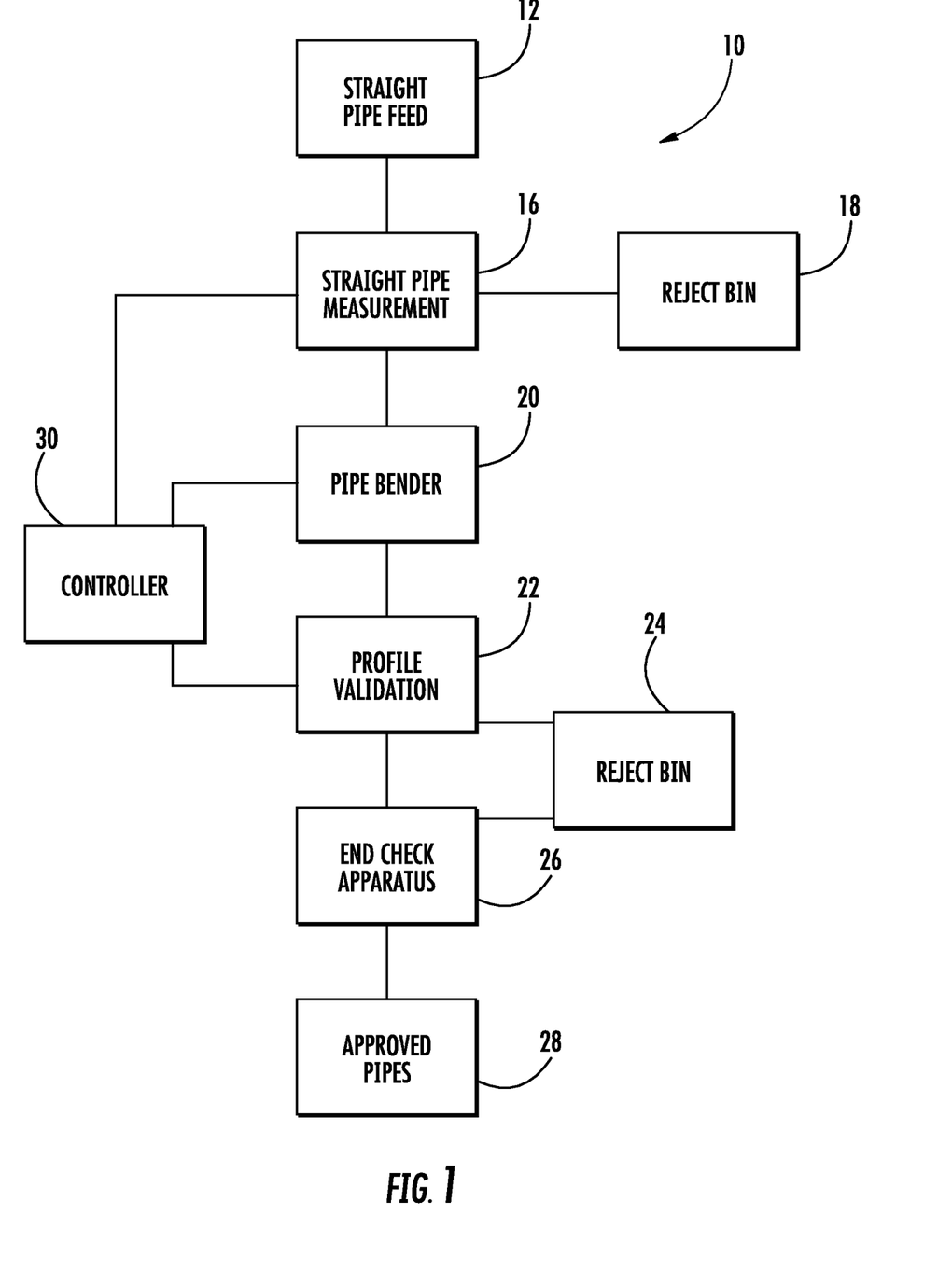
FIG. 1 is a schematic illustration of a pipe bending apparatus in accordance with an embodiment of the invention.

A highly simplified schematic illustration of a pipe bending apparatus in accordance with the invention is identified generally by the numeral 10 in FIG. 1. The pipe bending apparatus 10 includes a straight pipe storage bin 12 for storing straight pipes that are to be bent by the apparatus 10. The pipe bending apparatus further includes a straight pipe measurement device 16, as shown in greater detail in FIG. 2. The pipe measurement device 16 measures actual lengths of the pipes received from the straight pipe bin 12. Pipes that are determined by the straight pipe measurement device 16 to be too long or too short are transferred to a reject bin 18. Pipes that are determined to have acceptable lengths are transferred to a pipe bender 20, which is illustrated in greater detail in FIG. 3. After the pipes have been bent into a specified shape by the pipe bender 20, pipes 14 that are determined by the profile validation device 22 to be unacceptable are transferred to a reject bin 24. Pipes 14 that are determined by the profile validation device 22 to be acceptable are analyzed further by an end checking apparatus 26. Bent pipes 14 that are determined by the end checking apparatus 26 to have end regions that are properly positioned and aligned are transferred to a receptacle 28 for approved pipes 14. Pipes 14 that are determined by the end checking apparatus 26 to be out of tolerance are transferred to the reject bin 24. The pipe bending apparatus 10 of FIG. 1 further includes a controller 30 that stores data regarding dimensions and shapes for the pipes 14 and that controls the operations of the straight pipe measurement device 16, the pipe bender 20, the profile validation device 22 and the end check apparatus 26.

Figure 2:
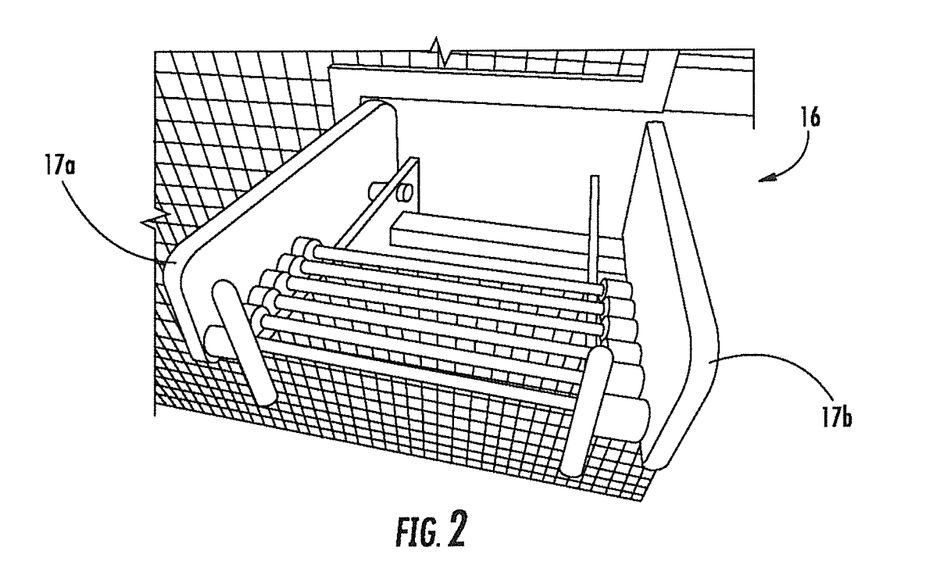
FIG. 2 is a perspective view of straight pipe length checking device.

The straight pipe measurement device 16, as shown in FIG. 2 is operative to position the straight pipes parallel to one another and perpendicular to end plates 17a and 17b. Each pipe is positioned with one end adjacent the end plate 17a. The position of the opposed end of the pipe relative to the end plate 17b then is determined so that the actual length of the pipe can be compared to a specified length. Pipes that do not conform to the specified length are transferred to the reject bin 18 without performing bending work on the dimensionally unacceptable pipes 44.

Figure 3:
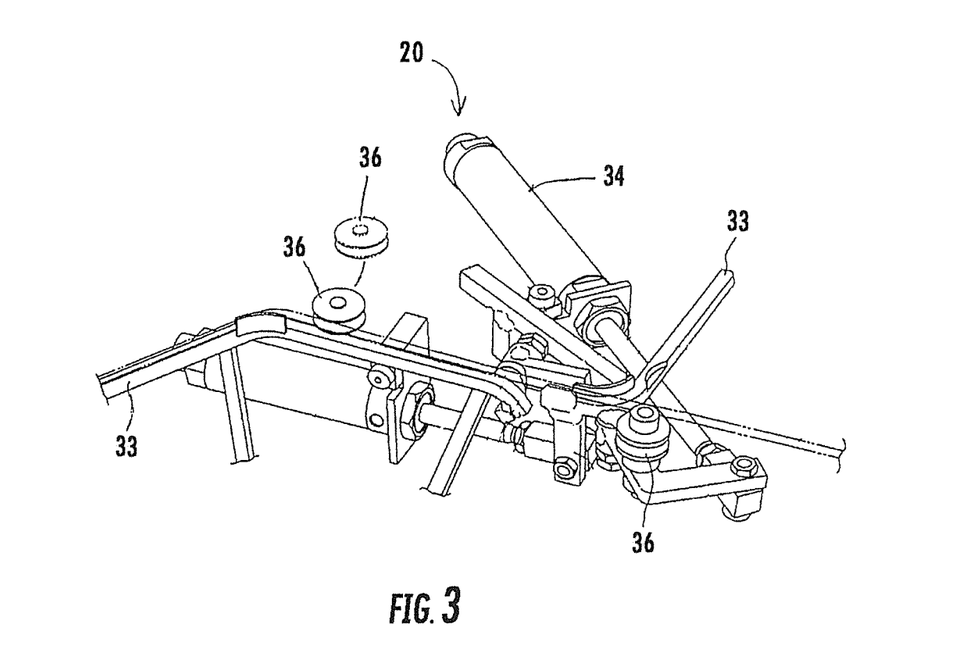
FIG. 3 is a schematic illustration of a known pipe bender that may be incorporated into the pipe bending apparatus of the invention.
Figure 4:
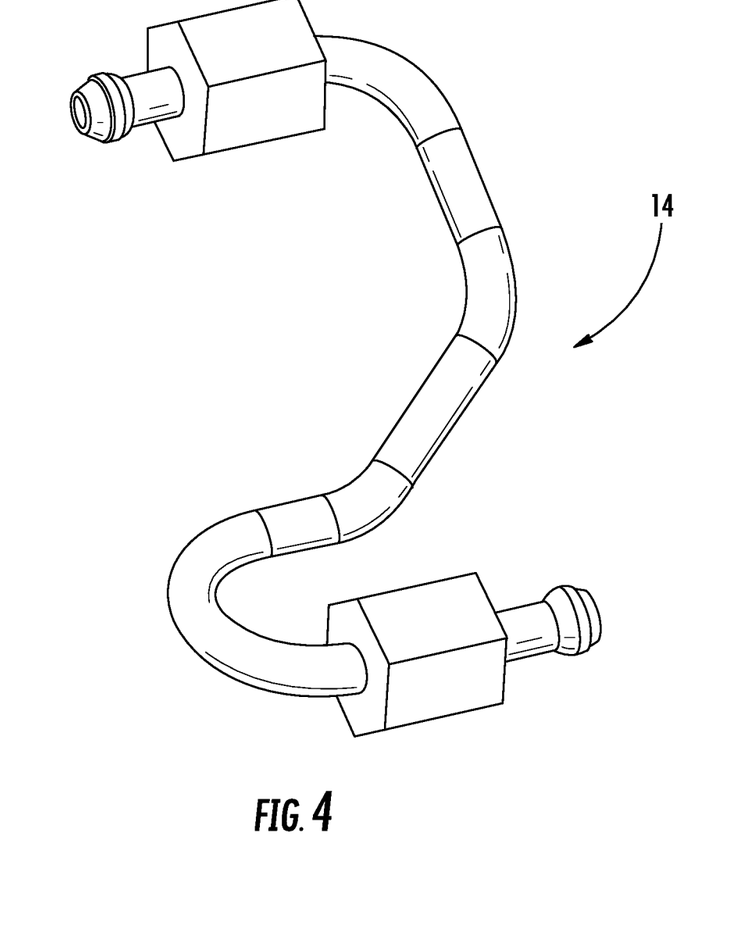
FIG. 4 is a perspective view of an example of a bent pipe that has been bent by the pipe bender of FIG. 3.

Straight pipes that are determined to have acceptable lengths are transferred to the pipe bender 20 having an analogous mechanism, as illustrated in FIG. 3. The pipe bender 20 illustrated in FIG. 3 is of prior art design, and conforms to the pipe bender illustrated in U.S. Pat. No. 4,938,050. The pipe bender 20 includes a stationary frame 33 and a bending member 36. The stationary frame 33 is formed by connecting bar stock or pipe stock together into a shape conforming to the finished curved shape of a pipe over its whole length and includes a bending section having a guide surface which has a curvature smaller than the bend radius of the pipe in its lengthwise direction and is orthogonal to a bend plane in its widthwise direction. The bending member 36 has an outer periphery facing the guide surface and is moved from outside the stationary frame 33 toward the stationary frame 33 by an actuator 34 attached to the frame such that the pipe is bent to lie along the guide surface. The straight pipe is secured at its fixed point by the use of a clamping tool and then the bending work is carried out from the secured portion toward a free end by causing the straight or circular movement of the bending member 36 progressively toward the frame such that the pipe is pressed against to lie along the frame in contact therewith. One example of a bent pipe 14 is shown in FIG. 4. The bender 20 can take many other forms. For example, the pipe may be gripped at an intermediate position rather than the end. Rollers of plural radial dimensions can be provided for forming bends of different radii of curvatures.

Figure 5:
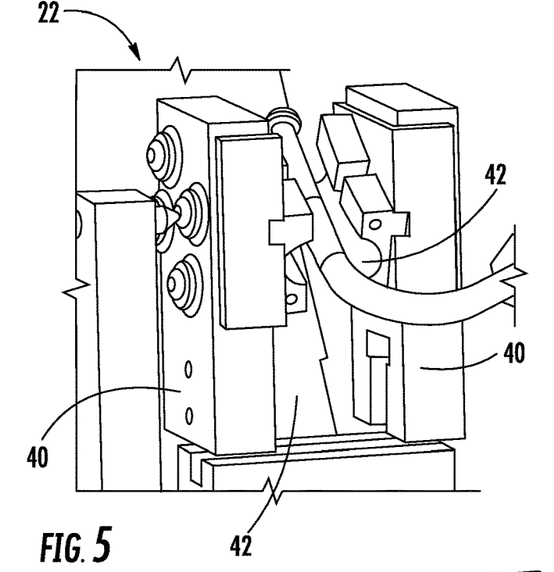
FIG. 5 is a perspective view of a profile validation device of the pipe bending apparatus in an open position of the profile validation device
Figure 6:
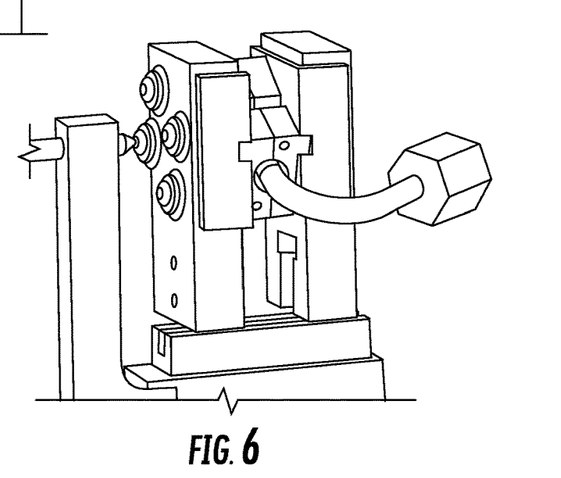
FIG. 6 is a perspective view of the profile validation device of FIG. 5 in the closed position.
Figure 7:
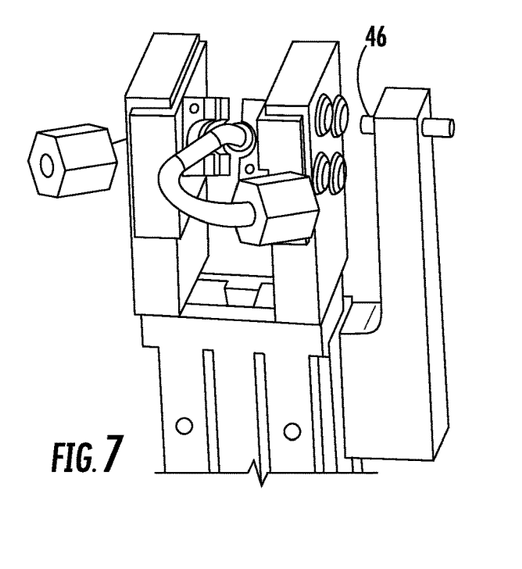
FIG. 7 is a perspective view showing the back-check sensors of the profile validation device of FIGS. 5 and 6.

The bent pipe 14 then is validated by the profile validation device 22, as illustrated in FIGS. 5-7. The profile validation device includes at least one pair of profile validation channels 40, with the profile validation channels 40 in each pair having a concave surface 42 disposed to face the opposing profile validation channel 40 in the respective pair. The profile validation channels 40 can be moved to an open position illustrated in FIG. 5 where the profile validation channels 40 are spaced from one another so that a straight section of the bent pipe 14 can be placed between the profile validation channels 40 in the respective pair. The profile validation channels 40 in each pair also can be moved to a closed position, as illustrated in FIG. 6, where the concave surfaces 42 of the profile validation channels 40 form a continuous cylindrical channel that will surround a straight section of the bent pipe 14. The profile validation device 22 includes sensors that sense contact of the pipe 14 with either of the profile validation channels 40 in the respective pair. A pipe 14 that has been bent properly or that is within a predetermined range of tolerances will not contact either of the profile validation channels 40. On the other hand, a profile validation channel 40 that senses contact with a bent pipe indicates that the bent pipe does not conform to specifications and must be transferred to the reject bin 24 or possibly subjected to corrective bending.

A pipe 14 that does not conform to the bent specifications is likely to contact one or both profile validation channels 40 and can cause one or both profile validation channels 40 to shift from a specified position. Additionally, forces generated by moving the profile validation channels 40 between the open and closed positions can cause shifting of the respective profile validation channels 40. Accordingly, the profile validation device 22 has back-check sensors 46, as shown in FIG. 7. The back-check sensors 46 are operative to sense the positions of the profile validation channels 40 upon the completion of each bend, or upon completion of a selected number of bends or upon completion of a bend where a pipe 14 has contacted a profile validation channel 40. Adjustments to the profile validation channels 40 then can be carried out if necessary.

Figure 8:
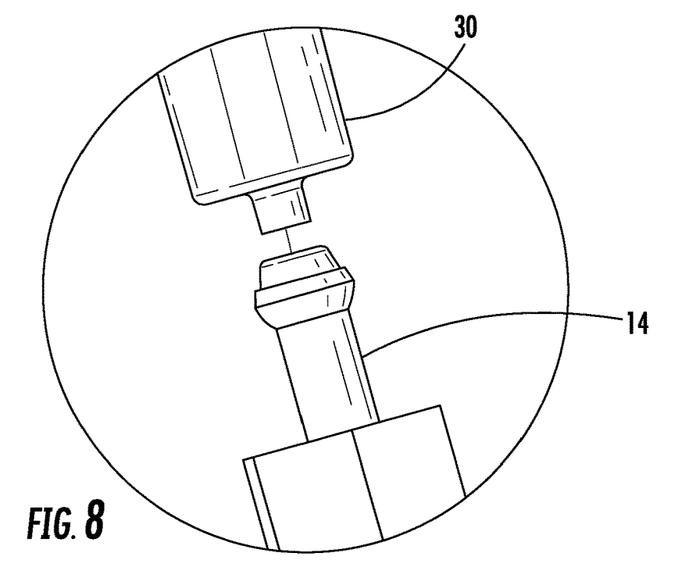
FIG. 8 is a perspective view of a position sensor of an end check apparatus for sensing the position of the free end of the bent pipe.
Figure 9:
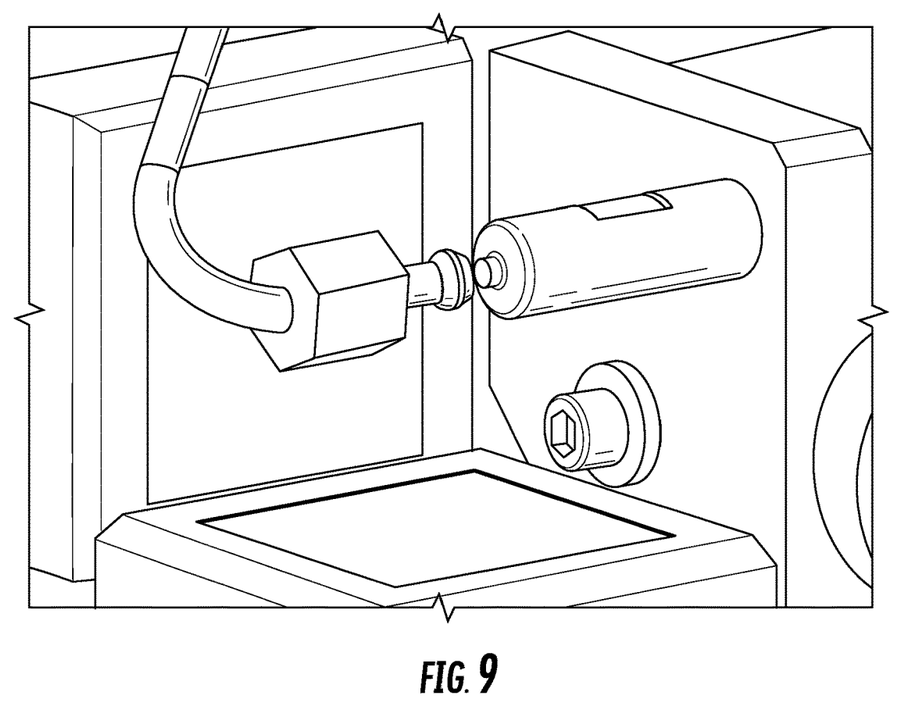
FIG. 9 is a perspective view of the position sensor of FIG. 8
Figure 10:
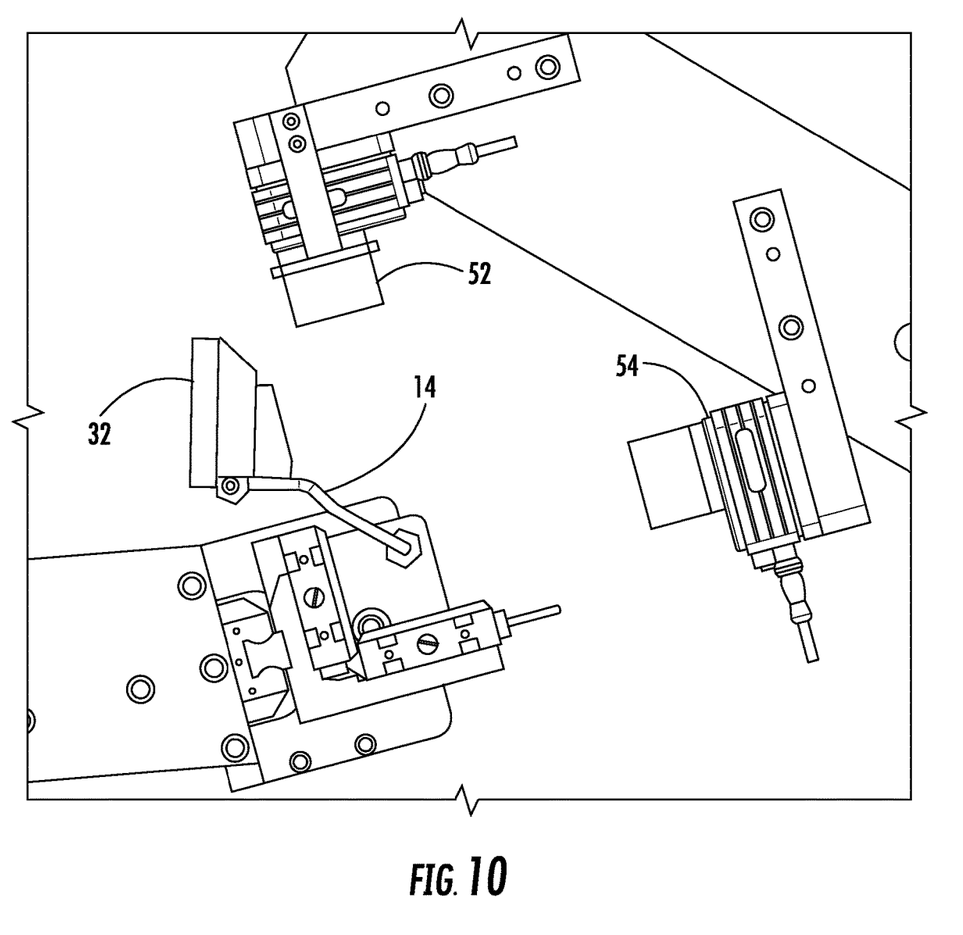
FIG. 10 is a plan view showing a camera assembly for validating and alignment of a portion of the bent pipe in proximity to the free end.
Figure 11:
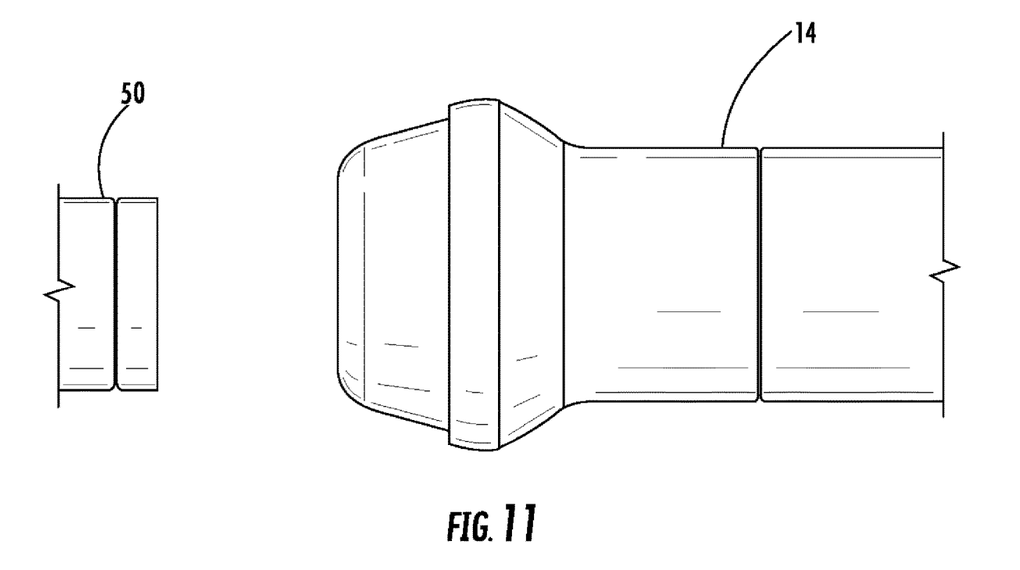
FIG. 11 is an image of a free end of a bent pipe within tolerance.
Figure 12:
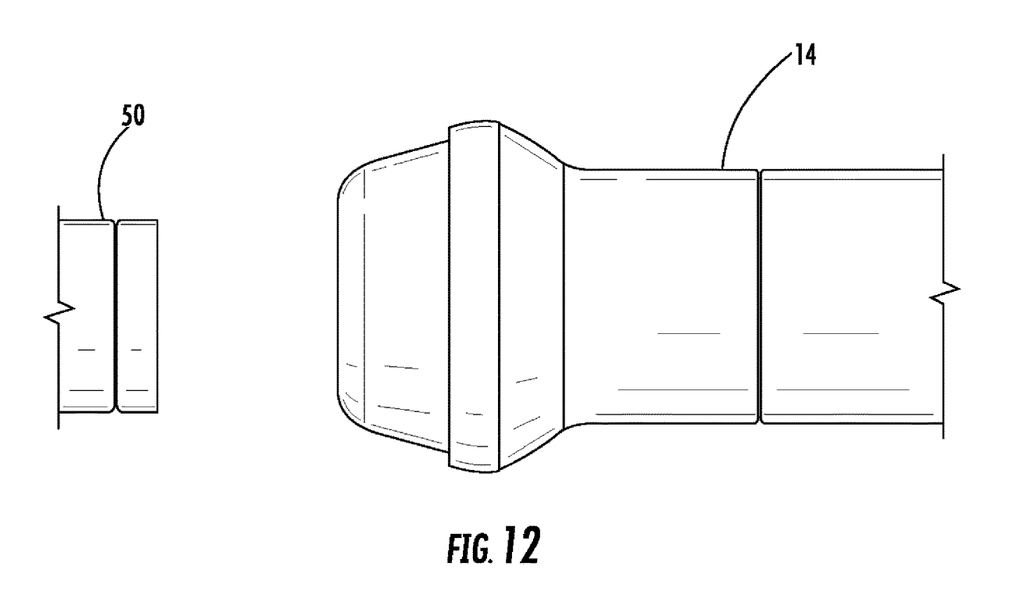
FIG. 12 is an image of free end of a bent pipe that is not within tolerance.

Those pipes 14 determined by the profile validation device 22 to have an acceptable profile at intermediate positions along the pipe 14 are transferred to pipe end checking apparatus 26. The pipe end checking apparatus 26 includes a criteria pin 50 opposed to a specified position for the extreme free end of the bent pipe 14. The criteria pin 50 provides a datum or frame of reference with respect to both the position and alignment of the free end of the bent pipe 14, as illustrated in FIGS. 8 and 9. The end checking apparatus 26 further includes two cameras 52 and 54 facing toward a predetermined position of a region of the bent pipe 14 in proximity to the free end of the pipe 14, as illustrated in FIG. 10. The cameras 52 and 54 are aligned perpendicular to one another and are operative to produce images of the pipe 14 and the criteria pin 50 in two perpendicular planes. These images then can be compared by the controller 30 to specified positions and alignments of the end region of the bent pipe 14. FIG. 11 provides an example of an image produced by one of the cameras 52 or 54 of a pipe 14 that has a proper alignment and position as compared to a specified alignment and position. FIG. 12 is an example of an image produced by one of the cameras 52 or 54 of a pipe 14 that is not aligned within a specified range of tolerances for the bent pipe 14. Thus, the pipe 14 illustrated in FIG. 12 would be transferred to the reject bin 24 or possibly could be subjected to corrective bending.

What is claimed is:

1. An apparatus for bending a pipe and testing a shape of the pipe after bending, comprising:
   a bender for bending a pipe a specified amount;
   a criteria pin in proximity to the bender and defining a specified position and alignment for a free end of the pipe after completing a plurality of bends;
   at least one camera in proximity to the bender and the criteria pin for obtaining at least one image of the pipe and the criteria pin in proximity to the free end of the pipe for determining a position and an alignment of the pipe in proximity to the free end; and
   a controller connected to the at least one camera, the controller being operative to compare the location of the free end of the pipe to a specified location and to compare the alignment of the free end of the pipe to a specified alignment, wherein the controller is connected to the bender and operates the bender to form specified bends in the pipe.

2. The apparatus of claim 1 wherein the at least one camera comprises at least two cameras disposed for obtaining images of the free end of the pipe and the criteria pin from at least two different angular orientations.

3. The apparatus of claim 2, wherein the two cameras are aligned substantially perpendicular to one another.

4. The apparatus of claim 1 further comprising at least two profile validation channels positionable in proximity to a straight section of the pipe between two adjacent bends in the pipe for determining a position and an alignment of the straight section of the pipe.

5. The apparatus of claim 4, wherein each of the profile validation channels is substantially semi cylindrical, the semi cylindrical profile validation channels having concave sides configured to be positioned in opposed facing relationship radially outward of the pipe.

\* \* \* \* \*